United States Patent
Sawada

(10) Patent No.: US 9,875,635 B2
(45) Date of Patent: Jan. 23, 2018

(54) PROXIMITY DETECTION SYSTEM

(71) Applicant: YOSHIKAWA KOGYO CO., LTD., Fukuoka (JP)

(72) Inventor: Kikuzo Sawada, Fukuoka (JP)

(73) Assignee: YOSHIKAWA KOGYO CO. LTD., Fukuoka (JP)

(*) Notice: Subject to any disclaimer, the term of this patent is extended or adjusted under 35 U.S.C. 154(b) by 127 days.

(21) Appl. No.: 14/371,345

(22) PCT Filed: Jan. 10, 2013

(86) PCT No.: PCT/JP2013/050260
§ 371 (c)(1),
(2) Date: Jul. 9, 2014

(87) PCT Pub. No.: WO2013/105589
PCT Pub. Date: Jul. 18, 2013

(65) Prior Publication Data
US 2014/0361903 A1   Dec. 11, 2014

(30) Foreign Application Priority Data
Jan. 12, 2012   (JP) .................................... 2012-4316

(51) Int. Cl.
*G08B 21/18* (2006.01)
*G01V 15/00* (2006.01)
(Continued)

(52) U.S. Cl.
CPC ............ *G08B 21/18* (2013.01); *B66F 17/003* (2013.01); *G01V 3/081* (2013.01); *G01V 15/00* (2013.01);
(Continued)

(58) Field of Classification Search
None
See application file for complete search history.

(56) References Cited

U.S. PATENT DOCUMENTS 7,317,388 B2   1/2008 Kawabe
9,230,419 B2 *  1/2016 Beggs .................. B60Q 1/2673
(Continued)

FOREIGN PATENT DOCUMENTS

DE   102005014718 A1   12/2005
JP   05-321303 A      12/1993
(Continued)

OTHER PUBLICATIONS

International Search Report dated Mar. 19, 2013 for PCT/JP2013/050260.
(Continued)

*Primary Examiner* — Brian Zimmerman
*Assistant Examiner* — Kevin Lau
(74) *Attorney, Agent, or Firm* — Paul D. Bianco; Stephen Bongini; Fleit Gibbons Gutman Bongini & Bianco PL

(57) ABSTRACT

Provided is a proximity detection system which is capable of changing a level of alarm depending on a distance between a worker and an apparatus, and setting an alarm-generating distance in an apparatus-side unit. The proximity detection system comprises a magnetic field detecting function-equipped RFID tag attachable to a worker, and a distance detection control unit installable in a self-propelled apparatus. The magnetic field detecting function-equipped RFID tag is configured to be selectively set between a plurality of levels of magnetic field detecting sensitivity, and comprises means to intermittently transmit setup magnetic field detecting sensitivity data and magnetic field detection data. The distance detection control unit is configured to output different levels of alarm according to the data received from the RFID tag.

12 Claims, 10 Drawing Sheets

(51) Int. Cl.
*G01V 3/08* (2006.01)
*G06K 7/10* (2006.01)
*B66F 17/00* (2006.01)
*E02F 9/24* (2006.01)
*E02F 9/26* (2006.01)

(52) U.S. Cl.
CPC .......... *G06K 7/10366* (2013.01); *E02F 9/24* (2013.01); *E02F 9/262* (2013.01)

(56) References Cited

U.S. PATENT DOCUMENTS

| | | | | |
|---|---|---|---|---|
| 2005/0111401 | A1* | 5/2005 | Terry | H03G 3/3052 370/328 |
| 2005/0218292 | A1 | 10/2005 | Kawabe | |
| 2009/0072961 | A1* | 3/2009 | Martin | G08B 29/24 340/522 |
| 2009/0273340 | A1* | 11/2009 | Stephanson | G01R 33/10 324/202 |

FOREIGN PATENT DOCUMENTS

| | | | |
|---|---|---|---|
| JP | 07-168985 A | | 7/1995 |
| JP | 07168985 A | * | 7/1995 |
| JP | 2005-291723 A | | 10/2005 |
| JP | 2005-346228 A | | 12/2005 |
| JP | 2006-065703 A | | 3/2006 |
| JP | 2006270462 A | * | 10/2006 |
| JP | 2006-337216 A | | 12/2006 |
| JP | 2007-225448 A | | 9/2007 |
| KR | 20060044938 A | | 5/2006 |

OTHER PUBLICATIONS

English translation of International Search Report dated Mar. 19, 2013 for PCT/JP2013/050260.

International Preliminary Report on Patentability dated Jul. 15, 2014 for PCT/JP2013/050260.

English translation of International Preliminary Report on Patentability dated Jul. 15, 2014 for PCT/JP2013/050260.

Written Opinion of the International Searching Authority dated Mar. 19, 2013 for PCT/JP2013/050260.

English translation of Written Opinion of the International Searching Authority dated Mar. 19, 2013 for PCT/JP2013/050260.

* cited by examiner

[Figure 1]
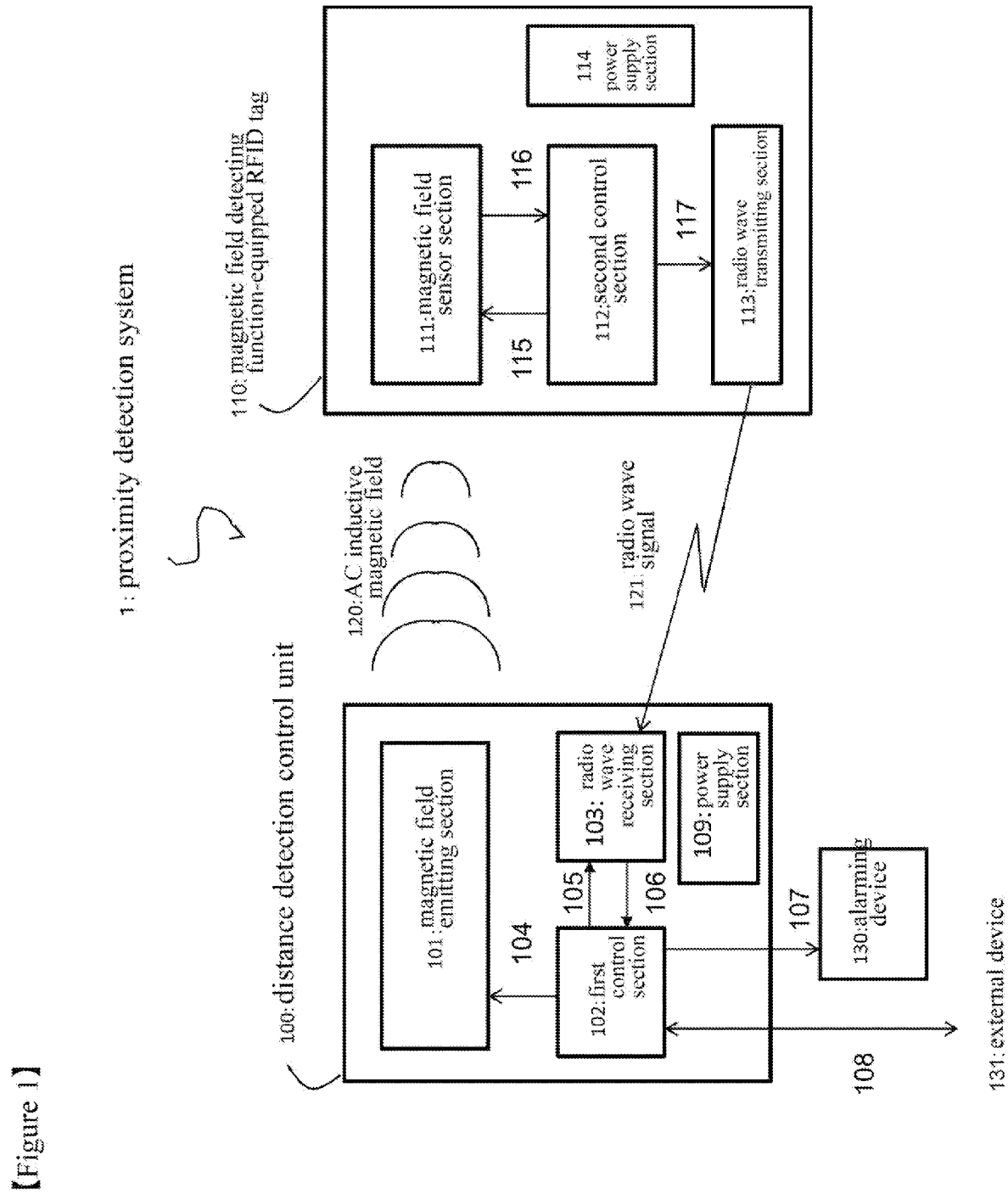

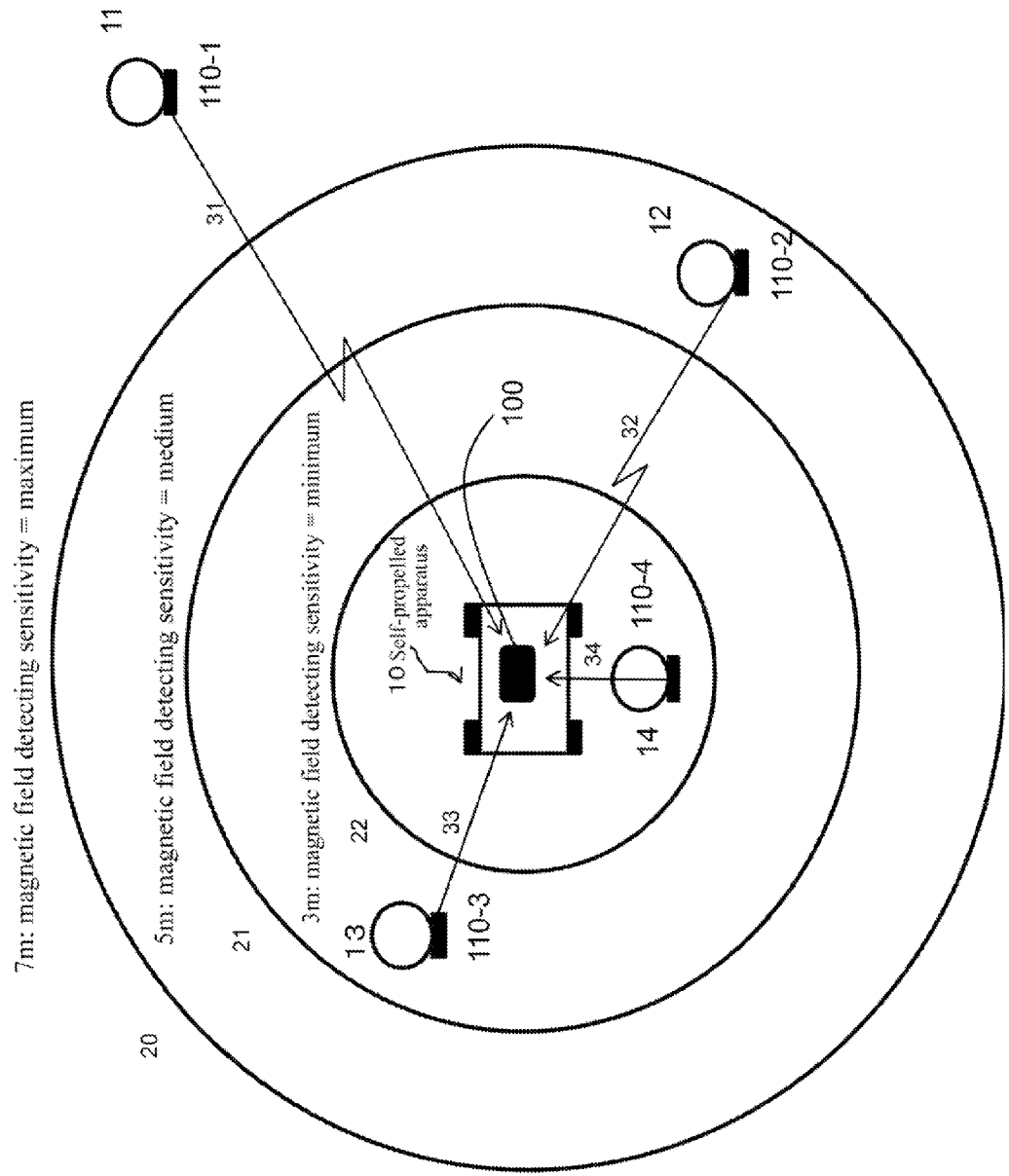
[Figure 2]

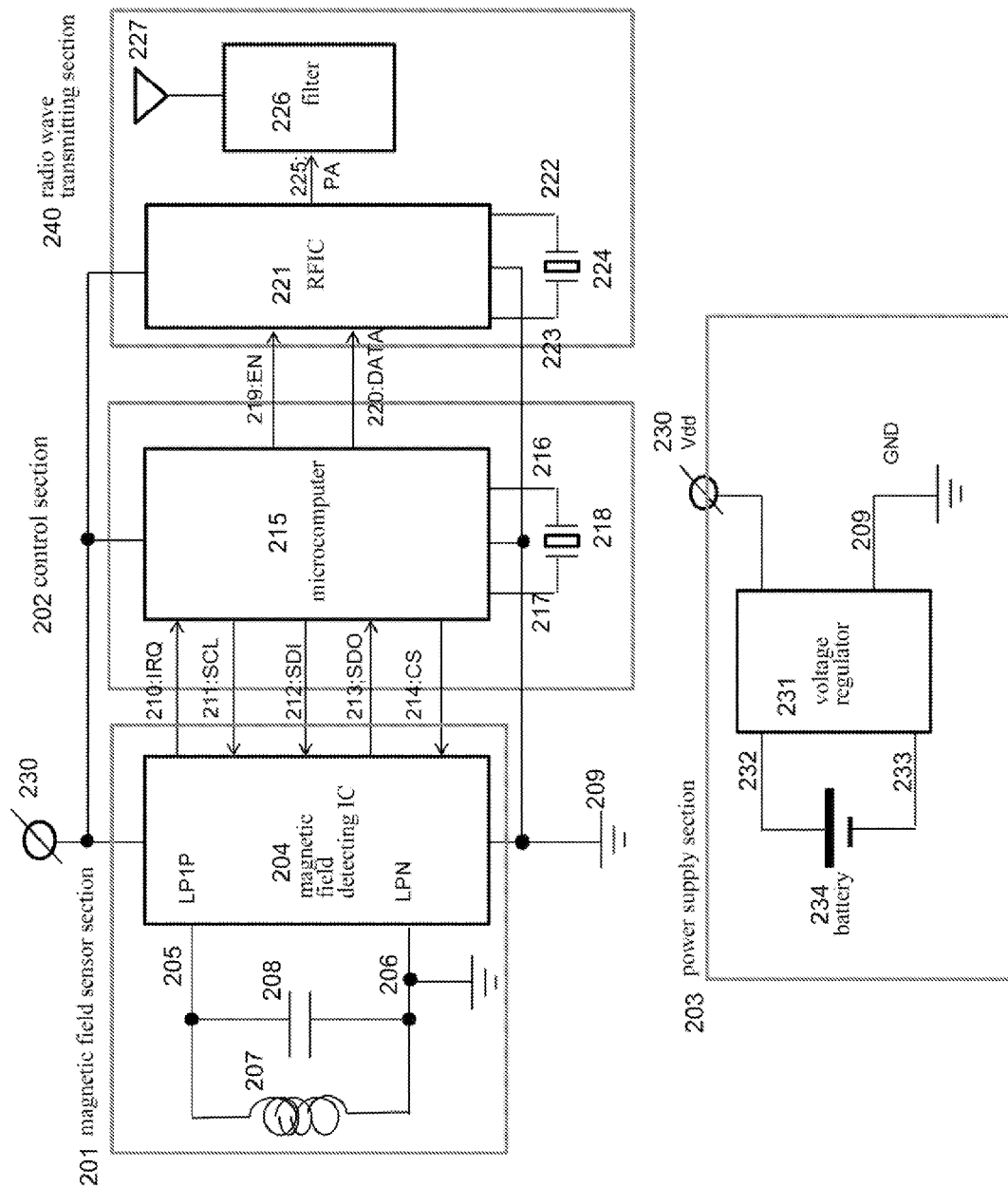
[Figure 3]

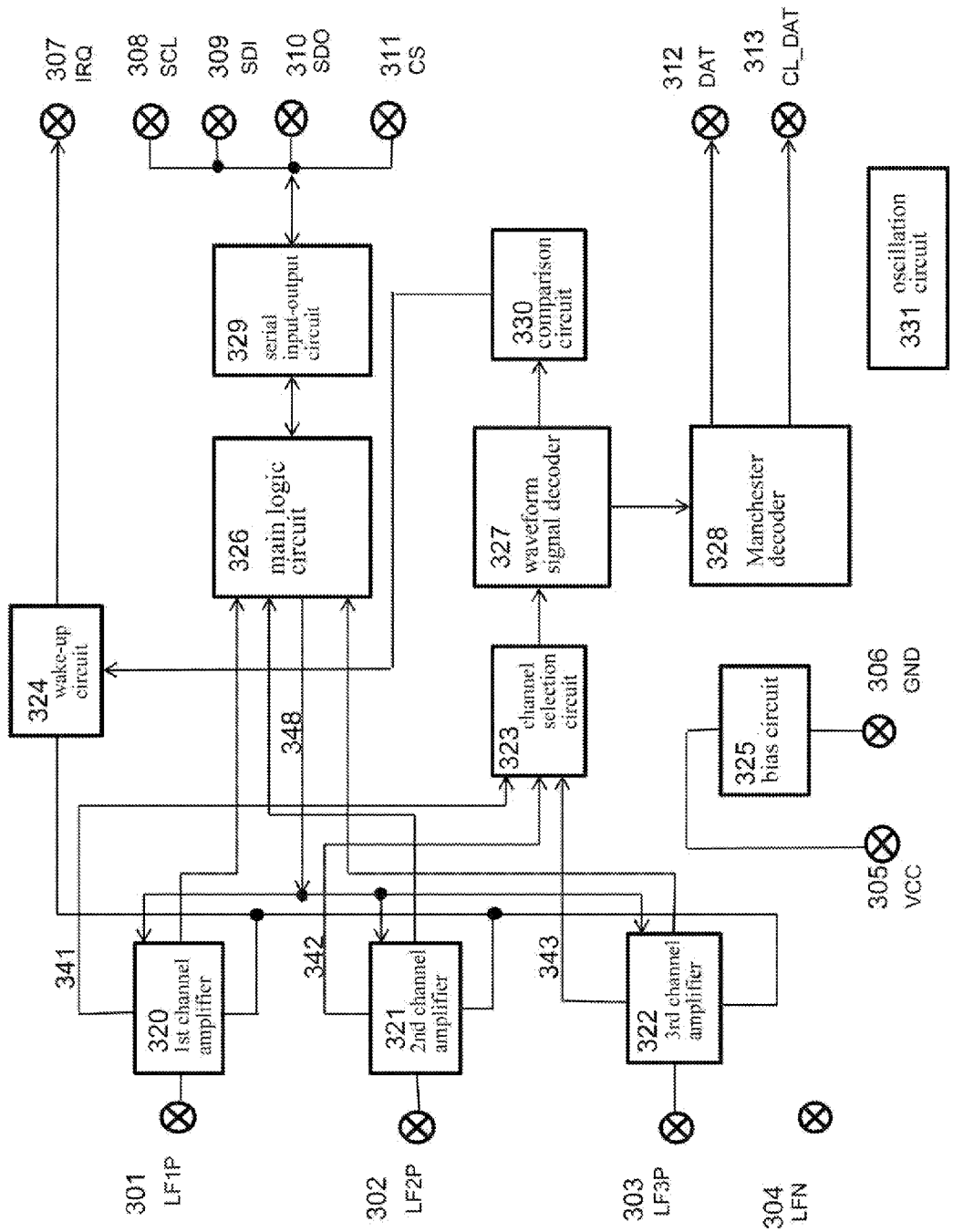

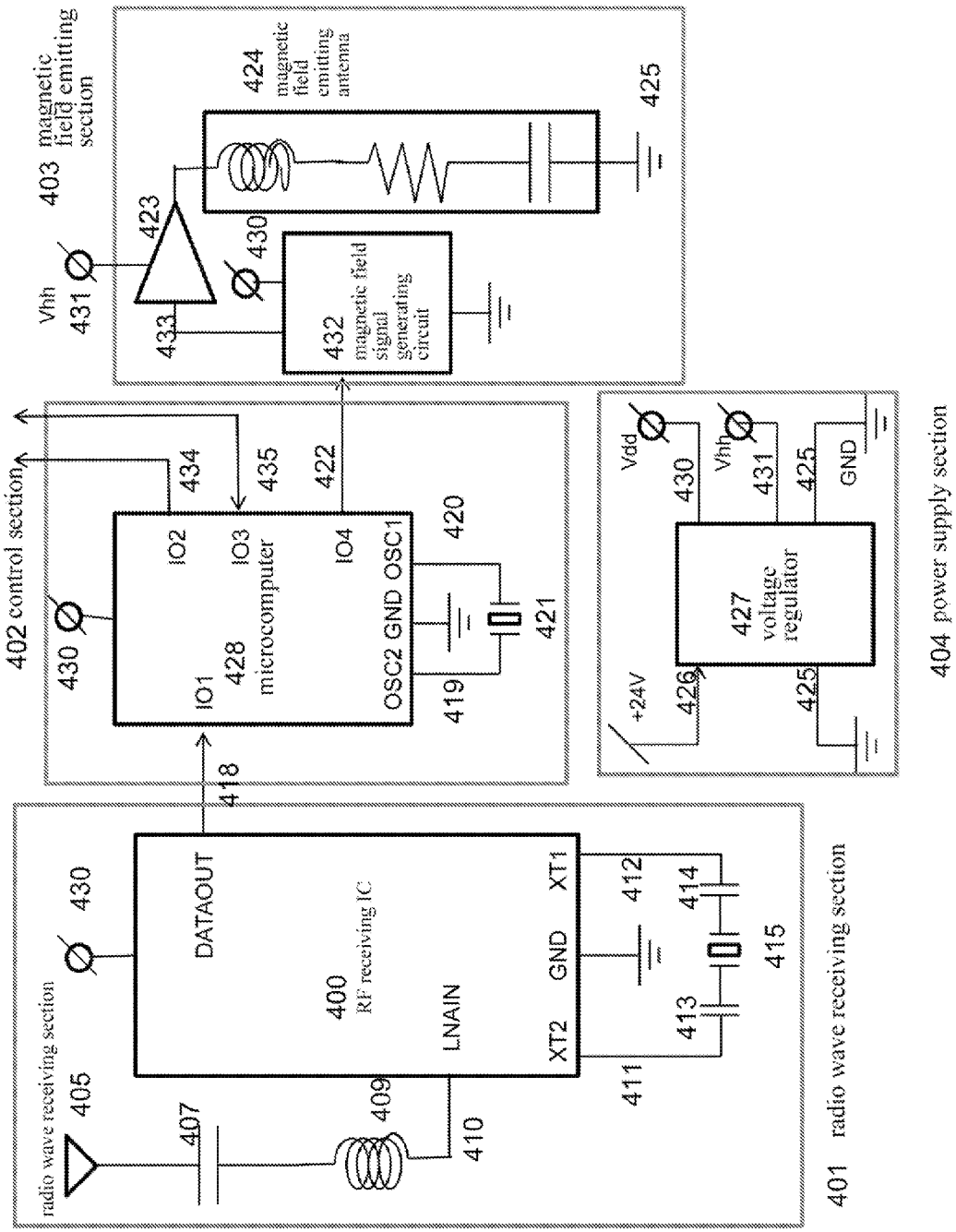
[Figure 5]

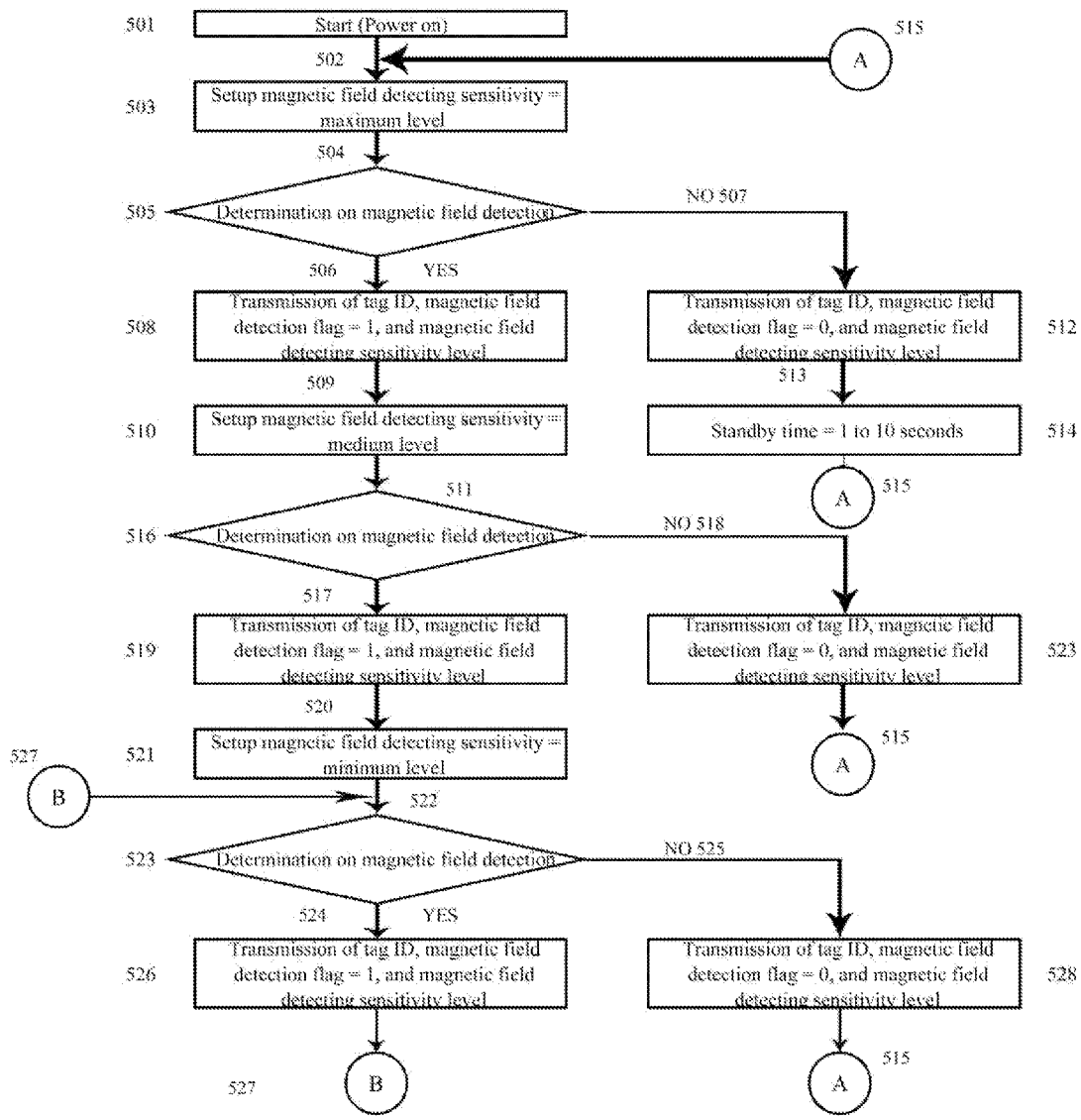

[Figure 7]
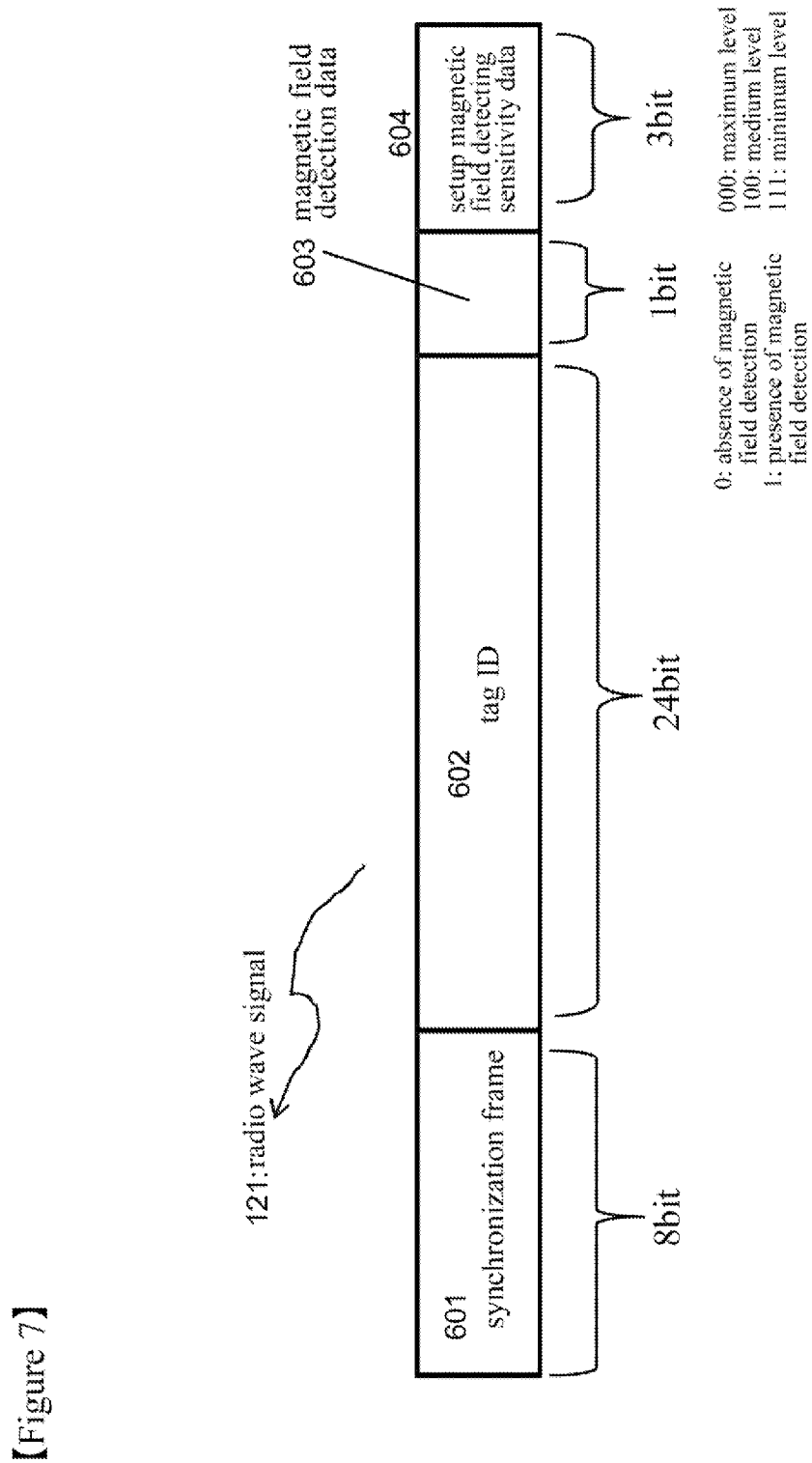

[Figure 8]
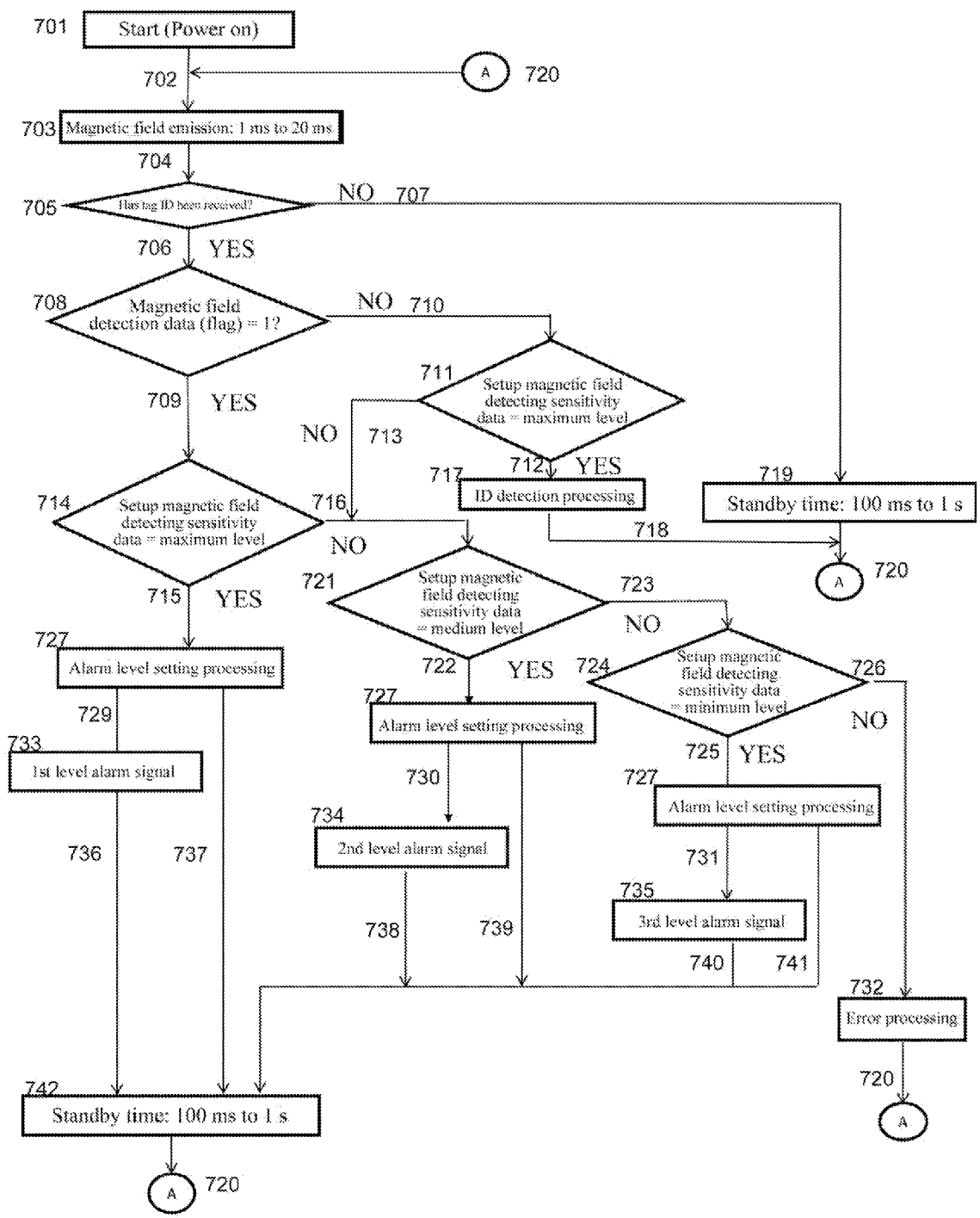

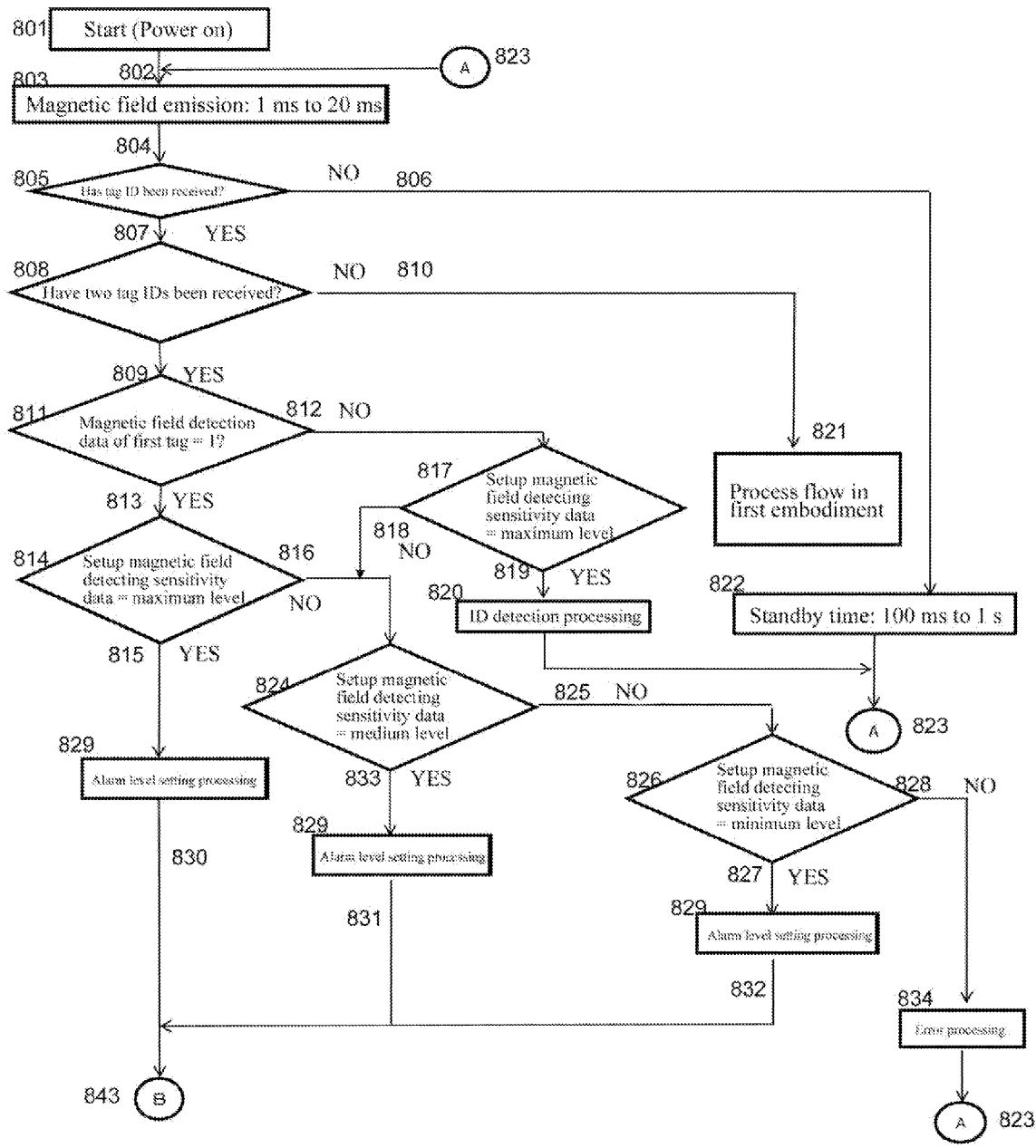

[Figure 9B]
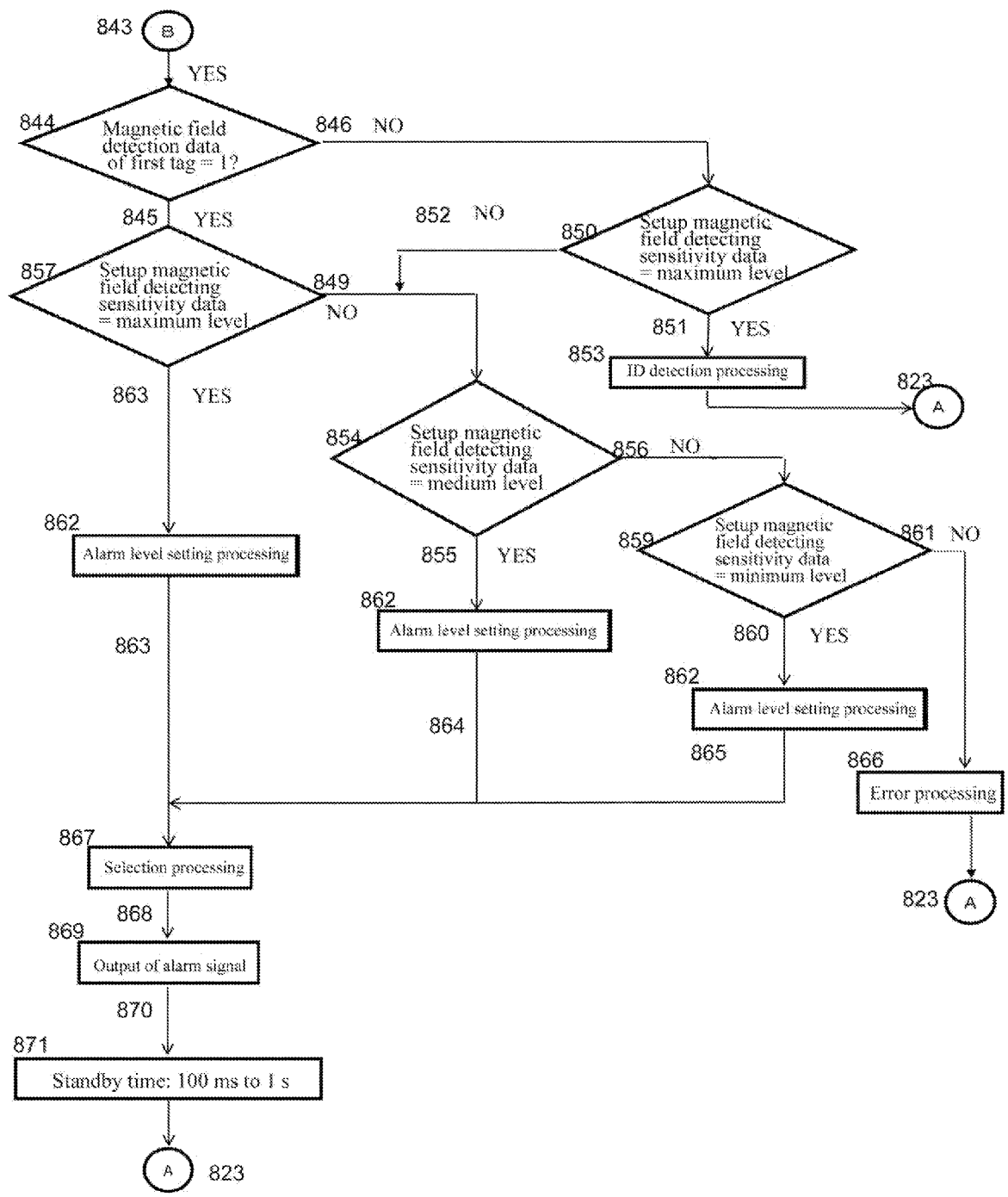

PROXIMITY DETECTION SYSTEM

TECHNICAL FIELD

The present invention relates to a proximity detection system, and more particularly to a worker proximity detection system configured to detect a proximity of a worker, for example, a fact that the worker comes close to a working vehicle in a work site where a certain work is performed using a working vehicle such as a forklift or a bulldozer, or a fact that the worker comes within a given distance range from a working machine such as a crane, to warn of the proximity by using a warning lamp and/or warning sound, or activate a brake or the like, or a working vehicle (apparatus) proximity detection system configured to detect that two working vehicles come close to each other within a given distance, to activate an alarm, a brake or the like.

As used in this specification, the term "apparatus" collectively means an apparatus capable of traveling by itself, i.e., capable of self-propelling, such as a working vehicle or a mobile crane, and an apparatus incapable of traveling by itself, i.e., incapable of self-propelling.

BACKGROUND ART

Heretofore, as a system for detecting that a worker comes excessively close to an apparatus capable of self-propelling, such as a forklift or a mobile construction machine (such an apparatus will hereinafter be referred to as "self-propelled apparatus"), there has been known a system using an ultrasonic wave and a radio wave, as disclosed in the following Parent Document 1, a system using an infrared (IR) sensor and a distance sensor, as disclosed in the following Parent Document 2, and a system using two radio waves, as disclosed in the following Parent Document 3. Further, the following Patent Document 4 discloses a system using an electromagnetic induction wave and a radio wave.

LIST OF PRIOR ART DOCUMENTS

Patent Documents

Patent Document 1: JP 05-321303A
Patent Document 2: JP 2006-337216A
Patent Document 3: JP 2005-346228A
Patent Document 4: JP 07-168985A

SUMMARY OF THE INVENTION

Technical Problem

In each of the above proximity detection systems, when a position detecting device installed in a self-propelled apparatus is a type utilizing an ultrasonic wave or infrared rays (an ultrasonic wave type or an infrared ray type), there is a problem that it can perform detection only in a certain direction, because an ultrasonic wave and infrared rays have directivity. Moreover, an ultrasonic wave is susceptible to atmospheric pressure and humidity, which leads to fluctuations in detection distance obtained using the ultrasonic wave-type distance detecting device. The infrared ray-type distance detecting device has a problem, for example, that, in outdoor use, a light-receiving section fails to adequately operate due to the influence of disturbance light such as sunlight.

Therefore, a type utilizing a radio wave (radio wave type) has been proposed as disclosed in the Patent Document 3. Depending on a type of antenna, for example, in the case where a dipole antenna or a helical antenna is used as a transmitting-side antenna, it can transmit a radio wave with no directivity, so that it is possible to perform 360-degree distance detection.

On the other hand, the radio wave-type distance detecting device has a problem that, depending on surrounding environment, radio wave reflection is likely to cause large fluctuations in detection distance. For example, assuming that a detection distance obtained using a certain radio wave-type distance detecting device is 4 m in an outdoor environment where there is no shielding object around the distance detecting device, the detection distance fluctuates in the range of 2 to 8 m in an indoor environment where there are shielding objects, such as a wall and/or equipment and machinery, within a radius of 10 m. There is another problem that, due to influences of the radio wave reflection, a communication hole (area where no communication can be locally established) is undesirably formed even within a radius of a relatively short distance from the distance detecting device The Patent Document 4 discloses a technique of performing distance detection by receiving a low-frequency or medium-frequency (30 kHz to 3 MHz) radio wave from a transmitting side, in an electromagnetic inductive manner. As described in the Patent Document 4, within a distance far less than a wavelength of the radio wave, the radio wave exhibits an attenuation property of an AC magnetic field, rather than an attenuation property of an electromagnetic wave. In theory, within a distance sufficiently shorter than a wavelength of the radio wave (in a near field), a magnetic field intensity H is attenuated in inverse proportion to a cube of the distance. On the other hand, within a distance sufficiently longer than the wavelength of the radio wave (in a far field), an electric field E is attenuated in inverse proportion to a square of the distance. That is, when the above electromagnetic induction scheme in the near field is utilized for distance detection, the steeper attenuation property allows the distance detection to become insusceptible to influences of the radio wave reflection. In addition, a low-frequency or medium-frequency radio wave almost does not undergo attenuation by water, so that it is unnecessary to have concerns about influences of a human body on the distance detection. Therefore, for example, accuracy in detection distance is improved to about 3 to 5 m, including fluctuations, with respect to a desired value of 4 m.

Meanwhile, regarding detection of a proximity between a self-propelled apparatus and a worker, there is a need for changing a level of alarm depending on a distance between the worker and the self-propelled apparatus. For example, it is conceivable to generate a first alarm and a second alarm indicative of a higher risk, respectively, when the distance is 7 m and when the distance is 5 m, and activate a brake of the self-propelled apparatus when the distance is 3 m.

However, the Patent Document 4 does not disclose any device configuration and methodology concerning the need for changing a level of alarm depending on the distance.

There is another need for changing an alarm-generating distance at which an alarm is to be generated, depending on a situation of a work site where a certain work is performed using a self-propelled apparatus. It is convenient that this operation is performed in a unit which is installed in the self-propelled apparatus (apparatus-installed unit), not in a counterpart unit which is attached to a worker (worker-attached unit). This is because, in a proximity detection system, a required number of the worker-attached units is generally greater than a required number of the apparatus-installed units, so that it takes more time and effort for the worker-attached units to change a setting thereof, as compared to the apparatus-installed units.

However, the Patent Document 4 does not disclose a technique of performing changing and setting a magnet field-detectable distance (i.e., alarm-generating distance) by using a unit installed in the apparatus-installed unit.

It is therefore an object of the present invention to provide a proximity detection system capable of changing a level of alarm depending on a distance between a worker and an apparatus, and setting an alarm-generating distance in an apparatus-side unit.

It is therefore another object of the present invention to provide a proximity detection system capable of, when a plurality of workers come close to an apparatus, detecting one of the workers most proximal to the apparatus to generate an alarm for the detected worker.

Solution to the Technical Problem

The present invention provides a proximity detection system which is configured to detect a distance between a distance detection control unit and a magnetic field detecting function-equipped RFID tag to generate a proximity alarm, wherein: the distance detection control unit comprises an inductive magnetic field emitting section, a radio wave receiving section, and a first control section operable to control radio the wave receiving section and the magnetic field emitting section; and the magnetic field detecting function-equipped RFID tag comprises a magnetic field sensor section operable to detect an inductive magnetic field emitted from the inductive magnetic field emitting section, a second control section operable to set a magnetic field detecting sensitivity of the magnetic field sensor section based on magnetic field detecting sensitivity setting data, and receive a magnetic field detection signal from the magnetic field sensor section, and a radio wave transmitting section operable to receive a signal from the second control section, and transmit at least magnetic field detection data, and setup magnetic field detecting sensitivity data, and wherein: the setup magnetic field detecting sensitivity data includes at least two levels of magnetic field detecting sensitivity; and the first control section is capable of receiving the magnetic field detection data and the setup magnetic field detecting sensitivity data via the radio wave receiving section, and outputting a plurality of levels of proximity alarm based on the setup received magnetic field detecting sensitivity data.

Preferably, in the proximity detection system of the present invention, the magnetic field sensor section is capable of varying the magnetic field detecting sensitivity based on the magnetic field detecting sensitivity setting data transmitted from the second control section, and the magnetic field detecting function-equipped RFID tag is capable of intermittently transmitting the magnetic field detection data and the setup magnetic field detecting sensitivity data, based on the at least two levels of magnetic field detecting sensitivity.

In the proximity detection system of the present invention, the magnetic field detecting function-equipped RFID tag may be provided in a plural number. In this case, it is preferable that the first control section is capable of receiving the magnetic field detection data and the setup magnetic field detecting sensitivity data from each of the plurality of magnetic field detecting function-equipped RFID tags, and selecting one of the plurality of magnetic field detecting function-equipped RFID tags having a lowest one of the levels of magnetic field detecting sensitivity, based on the plurality of setup magnetic field detecting sensitivity data, to output a proximity alarm for the selected magnetic field detecting function-equipped RFID tag.

In the proximity detection system of the present invention, the distance detection control unit may be installed in an apparatus, and the magnetic field detecting function-equipped RFID tag may be attached to a worker. Alternatively, the distance detection control unit may be installed in a first apparatus, and the magnetic field detecting function-equipped RFID tag may be installed in a second apparatus, wherein at least one of the first apparatus and the second apparatus is a self-propelled apparatus.

Effect of the Invention

In the present invention, the magnetic field detecting sensitivity of the magnetic field detecting function-equipped RFID tag configured to detect an inductive magnetic field from the distance detection control unit is set to at least two levels, so that it becomes possible to change a level of alarm depending on the distance between the distance detection control unit (e.g., an apparatus) and the magnetic field detecting function-equipped RFID tag (e.g., a worker).

Further, an alarm-generating distance can be set by the first control section of the distance detection control unit. Thus, it becomes possible to easily set and change the alarm-generating distance.

In addition, when the plurality of magnetic field detecting function-equipped RFID tags (e.g., a plurality of workers) come close to the distance detection control unit (e.g., an apparatus), it becomes possible to detect one of the workers most proximal to the apparatus to generate an alarm for the detected worker, i.e., to generate an alarm for one of the workers who is at the most dangerous position.

BRIEF DESCRIPTION OF THE DRAWINGS

FIG. 1 is a block diagram illustrating a proximity detection system according to a first embodiment of the present invention.

FIG. 2 is a conceptual diagram exemplifying a positional relationship between a distance detection control unit and an RFID tag, in the proximity detection system according to the first embodiment, and for explaining a function and operation of the present invention.

FIG. 3 is a block diagram illustrating the RFID tag in the proximity detection system according to the first embodiment.

FIG. 4 is a block diagram illustrating a magnetic field detecting IC in the proximity detection system according to the first embodiment.

FIG. 5 is a block diagram illustrating the distance detection control unit in the proximity detection system according to the first embodiment.

FIG. 6 is a flow chart of a process to be executed in the magnetic field detecting function-equipped RFID tag of the proximity detection system according to the first embodiment.

FIG. 7 illustrates one example of a content of data in a radio wave signal to be transmitted from the RFID tag to the distance detection control unit, in the proximity detection system according to the first embodiment.

FIG. 8 is a flow chart illustrating a process to be executed in the distance detection control unit of the proximity detection system according to the first embodiment.

FIG. 9A is a flow chart illustrating (a first half of) a process to be executed in a distance detection control unit of a proximity detection system according to a second embodiment of the present invention.

FIG. 9B is a flow chart illustrating (a second half of) the process to be executed in the distance detection control unit of the proximity detection system according to the second embodiment.

DESCRIPTION OF EMBODIMENTS

The present invention will now be described based on embodiments thereof illustrated in the drawings.

FIG. 1 is a block diagram illustrating a proximity detection system according to a first embodiment of the present invention. The proximity detection system 1 according to the first embodiment comprises at least one distance detection control unit 100 and at least one magnetic field detecting function-equipped RFID tag 110.

The distance detection control unit 100 comprises a magnetic field emitting section 101, a first control section 102, a radio wave receiving section 103, and a power supply section 109. The magnetic field detecting function-equipped RFID tag 110 comprises a magnetic field sensor section 111, a second control section 112, a radio wave transmitting section 113, and a power supply section 114.

The distance detection control unit 100 is installed, for example, onto a top panel of a forklift as a self-propelled apparatus, wherein the magnetic field emitting section 101 is operable, during operation of the forklift, to emit therefrom a low-frequency (e.g., 125 kHz) AC inductive magnetic field 120. Then, the magnetic field sensor section 111 of the magnetic field detecting function-equipped RFID tag (hereinafter referred to occasionally and simply as "RFID tag") 110 attached, for example, to a helmet of a worker, is operable, when it detects the AC inductive magnetic field 120, to output a magnetic field detection signal 116 to the second control section 112.

In this embodiment, the magnetic field sensor section 111 is capable of, when it receives magnetic field detecting sensitivity setting data 115 from the second control section 112, varying a magnetic field detecting sensitivity thereof, for example, between eight levels. By varying the magnetic field detecting sensitivity, a magnetic field-detectable range can be varied, for example, between 2 m and 8 m.

The second control section 112 is composed, for example, of an 8-bit CPU, and operable to receive the magnetic field detection signal 116, and output, to the radio wave transmitting section 113, a signal 117 comprising magnetic field detection data, setup magnetic field detecting sensitivity data, and a unique identification number (ID) of the RFID tag 110. The radio wave transmitting section 113 is operable, when it receives the signal 117, to convert the received signal into a UHF-band radio wave, and output the radio wave as a radio wave signal 121. That is, the radio wave signal 121 comprises at least ID information of the RFID tag, magnetic field detection data, and setup magnetic field detecting sensitivity data. A radio field intensity of the radio wave signal 121 is set to allow a communication distance to become greater than the magnetic field-detectable range, for example, in the range of 10 m to 20 m.

The radio wave receiving section 103 is operable to receive the radio wave signal 121 and output a received data signal 106 to the first control section 102. The first control section 102 is composed, for example, of an 8-bit CPU, and operable to receive the received data signal 106, and, based on the setup magnetic field detecting sensitivity data and magnetic field detection data comprised in the received data signal 106, calculate a magnetic field intensity of the AC inductive magnetic field 120 received by the RFID tag 110 to thereby derive a detection distance from the distance detection control unit 100.

The first control section 102 is operable, when it determines that the detection distance falls within a given distance, to output an alarm signal 107 to an alarming device 130. A specific meter of a magnetic field-detectable distance (alarm-generating distance) at which the first control section 102 generates the alarm signal 107 can be set and changed in the first control section 102. The setup magnetic field detecting sensitivity data of the radio wave signal 121 includes at least two levels of magnetic field detecting sensitivity. Thus, the first control section 102 is capable of generating a plurality of alarm outputs 107 depending on the number of the magnetic field-detectable distances.

The first control section 102 is connected with an external input-output signal line 108 for allowing input and output signals with respect to an external device 131 in a forklift or the like to be transmitted therethrough, and operable to receive an external input-output (input?) signal from the external input-output signal line 108, and the received data signal 106, and output a magnetic field emitting control signal 104 and a radio wave receiving control signal 105, respectively, to the magnetic field emitting section 101 and the radio wave receiving section 103.

As above, in the first embodiment, the ID of the RFID tag 110, the magnetic field detection data and the setup magnetic field detecting sensitivity data are comprised in the radio wave signal 121 to be transmitted from the RFID tag 110. This makes it possible to change a level of alarm depending on the distance between the worker and the self-propelled apparatus, and set the alarm-generating distance in the distance detection control unit (first control section 102).

FIG. 2 exemplifies a positional relationship between the distance detection control unit 100 and the RFID tag 110, in the proximity detection system 100 according to the first embodiment, and explains a function and operation of the present invention.

In FIG. 2, a self-propelled apparatus 10 has the distance detection control unit 100 installed therein, and a plurality of workers 11, 12, 13, 14 carry a plurality of the RFID tags 110-1, 110-2, 110-3, 110-4, respectively. In FIG. 2, the reference numerals 20, 21, 22 denote circles indicative of boundaries between respective ones of a plurality of different intensity ranges of an AC inductive magnetic field emitted from the distance detection control unit 100.

In other words, the magnetic field intensity can be digitally measured by changing the magnetic field detecting sensitivity of the RFID tag 110. The circle 20 represents a boundary in the case where the magnetic field detecting sensitivity is set to the maximum level, wherein it has a radius of about 7 m. The circle 21 represents a boundary in the case where the magnetic field detecting sensitivity is set to a medium level, wherein it has a radius of about 5 m. The circle 22 represents a boundary in the case where the magnetic field detecting sensitivity is set to the minimum level, wherein it has a radius of about 3 m.

Each of the RFID tags 110-1, 110-2, 110-3, 110-4 transmits a respective one of a plurality of radio wave signals 31, 32, 33, 34 each comprising an ID, magnetic field detection data and setup magnetic field detecting sensitivity data, intermittently, e.g., at time intervals of 0.1 seconds. Further, in each of the RFID tags 110-1, 110-2, 110-3, 110-4, a magnetic field detecting sensitivity is periodically changed by varying the magnetic field detecting sensitivity level, and one of the magnetic field detecting sensitivity levels which has enabled a magnetic field detection and one of the remaining magnetic field detecting sensitivity levels which has disabled the magnetic field detection are output in the form of a radio wave signal.

In other words, at a position of the worker 11, the magnet field cannot be detected even when the magnetic field detecting sensitivity is set to the maximum level. Thus, it can be determined that the worker 11 is located at a distance equal to or greater than 7 m from the self-propelled apparatus. At a position of the worker 12, the magnet field can be detected when the magnetic field detecting sensitivity is set to the maximum level, but cannot be detected when the magnetic field detecting sensitivity is set to the medium level. Thus, it can be determined that the worker 12 is located at a distance between 7 m and 5 m from the self-propelled apparatus. At a position of the worker 13, the magnet field can be detected when the magnetic field detecting sensitivity is set to the maximum level and the medium level, but cannot be detected when the magnetic field detecting sensitivity is set to the minimum level. Thus, it can be determined that the worker 13 is located at a distance between 5 m and 3 m from the self-propelled apparatus. At a position of the worker 14, the magnet field can be detected when the magnetic field detecting sensitivity is set to the maximum level, the medium level and the minimum level. Thus, it can be determined that the worker 14 is located at a distance equal to or less than 3 m from the self-propelled apparatus.

As above, in the first embodiment, the distance between each worker and the self-propelled apparatus can be approximately accurately detected (e.g., accuracy of 1 to 2 m).

FIG. 3 is a block diagram illustrating the magnetic field detecting function-equipped RFID tag 110 in the proximity detection system according to the first embodiment.

The magnetic field detecting function-equipped RFID tag 110 comprises a magnetic field sensor section 201, a control section 202, a radio wave transmitting section 240, and a power supply section 203. The magnetic field sensor section 201 comprises a magnetic field detecting IC 204, and a resonant circuit composed of a coil 207 and a capacitor 208. The resonant circuit has one end 205 connected to an analog signal input terminal LP1P of the magnetic field detecting IC 204, and the other end 206 connected to an analog signal input terminal LPN of the magnetic field detecting IC 204. The magnetic field detecting IC 204 is connected to an interrupt terminal of a microcomputer 215 of the control section 202, and configured to output a magnetic field detection signal 210 (IRQ) thereto. The magnetic field detecting IC 204 is also connected to the microcomputer 215 in such a manner that it can transmit or receive a serial clock input-signal 211 (SCL), a serial data input-signal 212 (SDI), a serial data output-signal 213 (SDO), and a chip selection signal 214 (CS).

The magnetic field detecting IC 204 is operable, when an AC inductive magnetic field is amplified up to a given signal level or more by the resonant circuit, and a given signal pattern is input into the analog input terminals LP1P, LPN, to set the magnetic field detection signal 210 (IRQ) to an active state (e.g., "1" in logical value; "high level" in voltage). The given signal level and the given signal pattern can be set and changed through the serial clock input-signal 211 (SCL), the serial data input-signal 212 (SDI) and the serial data output-signal 213 (SDO) from the microcomputer 215.

A clock oscillator 218 is connected to the microcomputer 215 via oscillation signal terminals 216, 217. The microcomputer 215 is also operable to output an enable signal 219 (EN) and a transmission data signal 220 (DATA) to an RFIC 221 of the radio wave transmitting section 240.

A clock oscillator 224 is connected to the RFIC 221 via oscillation signal terminals 223, 222. The RFIC 221 is operable to modulate the transmission data signal 220 (DATA) from the microcomputer 215 and output a resulting transmission RF signal 225 (PA) to a filter 226. The filter 226 is operable, when it receives the transmission RF signal 225 (PA), to perform a filtering action and then output the filtered signal to an antenna 227. A radio wave signal 121 (see FIG. 1) is transmitted from the antenna 227. For example, a frequency of the radio wave signal 121 may be 315 MHz, or may be 426 MHz, or may be 2.45 GHz.

The transmission data signal 220 (DATA) from the microcomputer 215 to the RFIC 221 is not necessarily continuous. For example, it may be an intermittent signal to be generated at time intervals of 0.1 to 10 seconds, wherein a duration of each signal ON time is about 10 msec.

The power supply section 203 comprises a battery 234 and a voltage regulator 231. The battery 234 is composed, for example, of a coin battery having a voltage of about 3.3 V. The battery 234 is connected to the voltage regulator 231 via terminals 232, 233, and configured to output a power-supply voltage signal 230 (Vdd) and a ground voltage signal 209 (GND). For example, the power-supply voltage signal 230 (Vdd) is in the range of 2.0 V to 2.5 V. The power-supply voltage signal 230 (Vdd) and the ground voltage signal 209 (GND) are connected, respectively, to a power-supply terminal and a ground terminal of each of the magnetic field detecting IC 204, the microcomputer 215 and the RFIC 221.

FIG. 4 is a block diagram illustrating the magnetic field detecting IC in the proximity detection system according to the first embodiment.

In FIG. 4, the reference numeral or code 301 (LF1P), 302 (LF2P), 303 (LF3P) and 304 (LFN) denote analog input-signal terminals, and a tuning circuit is externally connected thereto. In this embodiment, there are three analog input-signal terminals 301 (LF1P), 302 (LF2P), 303 (LF3P), in order to allow directions of coils constituting the tuning circuit to correspond to three directions (X axis, Y axis, Z axis), and allow the PFID tag with this IC mounted thereon to perform the magnetic field detection in all of the directions. The analog input-signal terminals 301 (LF1P), 302 (LF2P), 303 (LF3P) are connected, respectively, to input terminals of a first channel amplifier 320, a second channel amplifier 321 and a third channel amplifier 322.

Although each of the first channel amplifier 320, the second channel amplifier 321 and the third channel amplifier 322 is composed of an amplifier, a gain thereof can be adjusted in a plurality of levels according to a gain setting signal 348 from a main logic circuit 326. Three amplified signal outputs 341, 342, 343 from respective ones of the first channel amplifier 320, the second channel amplifier 321 and the third channel amplifier 322 are connected to a channel selection circuit 323. The channel selection circuit 323 is operable to select a largest one of the channel signals and output the selected signal to a waveform signal decoder 327. The waveform signal decoder 327 is operable to demodulate and convert the analog input-signal into a digital signal and output the digital signal to a comparison circuit 330 and a Manchester decoder 328. The comparison circuit 330 is operable to compare the input signal to a given pattern to determine whether they are coincident with each other, and, when it is determined that they are coincident with each other, to send a comparison signal to a wake-up circuit 324.

The wake-up circuit 324 is operable to receive the outputs from receiving the channel amplifiers and the comparison signal, and output a magnetic field detection 307 (IRQ). In other words, the magnetic field detecting IC 204 is configured to makes a determination on coincidence in terms of a signal pattern, based on the comparison circuit 330, in addition to detection of the presence or absence of a magnetic field signal and an intensity of the magnetic field signal.

The Manchester decoder 328 is operable to receive an output from the waveform signal decoder 327 and output a data clock signal 313 (CL_DAT) and output signal data 312 (DAT)

The main logic circuit 326 is operable to receive an input signal from a serial input-output circuit 329 and signals from the channel amplifiers to store a setup gain value, a signal pattern and others in a register, and send a required signal to each circuit. The serial input-output circuit 329 allows data in the register of the main logic circuit 326 to be transferred to the outside therethrough.

A bias circuit 325 is operable to receive a power-supply voltage signal 305 (VCC) and a ground voltage signal 306 (GND), and generate a bias voltage necessary in the IC. An oscillation circuit 331 is operable to generate a clock necessary in the IC, based on an internal circuitry thereof.

FIG. 5 is a block diagram illustrating the distance detection control unit 100 in the proximity detection system according to the first embodiment.

The distance detection control unit 100 comprises a radio wave receiving section 401, a control section 402, a magnetic field emitting section 403, and a power supply section 404.

The radio wave receiving section 401 comprises: a receiving antenna 405; a capacitor 407 and an inductance 409 making up a tuning circuit; and an RF receiving IC 400. The receiving antenna 405 is operable to receive a radio wave signal from the RFID tag 110, and the received radio wave signal is transmitted to an analog input terminal 410 (LNAIN) of the RF receiving IC 400 via the tuning circuit. An oscillator 415 and two tuning capacitors 413, 414 are connected to the RF receiving IC 400 oscillation terminals via oscillation terminals 411, 412. The RF receiving IC 400 is operable to amplify and demodulate an input signal from the analog input terminal 410 (LNAIN), and output a received data output-signal 418.

The received data output-signal 418 is input into a microcomputer 428 of the control section 402. The microcomputer 428 is operable to output an alarm output-signal 434 according to a tag ID, magnetic field detection data and setup magnetic field detecting sensitivity data comprised in the received data. According to need, the microcomputer 428 is also operable to a signal 422 to an aftermentioned magnetic field signal generating circuit 432. Further, the microcomputer 428 is interfaced with an external device via a signal 435. An oscillator 421 is connected to the microcomputer 428 via oscillation terminals 419, 420.

The magnetic field emitting section 403 comprises a magnetic field signal generating circuit 432, a drive circuit 423 and a magnetic field emitting antenna 424. The magnetic field signal generating circuit 432 is operable to form a signal 433 for generating an AC inductive magnetic field. For example, a frequency of the signal 433 is 125 kHz. The signal 433 is not necessarily continuous. For example, it may be an intermittent signal to be generated every 100 msec with a signal width of 10 msec. The input signal 422 from the microcomputer 428 is not essential to an operation of the magnetic field emitting section 403, and it is used only when there is a need to control the magnetic field emission by a value of the received data.

The signal 433 is input into the drive circuit 423, and converted into a voltage and a current necessary for drive of the magnetic field emitting antenna 424. For example, the voltage and the current are, respectively, in the range of 9 to 12V and in the range of 1 to 2 A. The magnetic field emitting antenna 424 is operable to generate and emit an AC inductive magnetic field in all directions.

A voltage regulator 427 is operable to receive an external power-source voltage input 426 and a ground voltage input 425, and generate a power-supply voltage signal 430 (Vdd) for the radio wave receiving section 401, the control section 402 and the magnetic field signal generating circuit 432. The voltage regulator 427 is also operable to generate a drive voltage 431 (Vhh) for the drive circuit 423. In this embodiment, a voltage value of the external power-source voltage input 426 is, for example, in the range of 12 to 48 V, and the power-supply voltage signal 430 (Vdd) and the drive voltage 431 (Vhh) are, for example, in the range of 3 to 5 V and in the range of 9 to 12 V, respectively.

FIG. 6 is a flow chart of a process to be executed in the magnetic field detecting function-equipped RFID tag of the proximity detection system according to the first embodiment.

Additionally with reference to FIG. 3, first of all, when the RFID tag (hereinafter referred to occasionally as "tag") is powered on (e.g., a battery is inserted into the tag), an operation thereof is started (501, 502). The microcomputer 215 first sets the magnetic field detecting sensitivity to the maximum level and sends a corresponding magnetic field detecting sensitivity setting signal to the magnetic field detecting IC 204 (503).

Then, the magnetic field detecting IC 204 sends a signal indicative of whether or not the magnetic field has been detected, to the microcomputer 215. In response to receiving the signal, the microcomputer 215 determines whether or not the magnetic field has been detected (504, 505)

When the magnetic field has been detected (506), the microcomputer 215 changes a magnetic field detection flag from "0" to "1", and sends the magnetic field detection flag "1" as magnetic field detection data to the radio wave transmitting section 240, together with a tag ID of the tag, and information about the setup magnetic field detecting sensitivity (i.e., the maximum magnetic field detecting sensitivity level). Then, the radio wave transmitting section 240 converts the tag ID, the magnetic field detection flag and the magnetic field detecting sensitivity information into a radio wave signal, and transmits the radio wave signal (508).

On the other hand, when the magnetic field has not been detected (507), the microcomputer 215 keeps the current magnetic field detection flag "0", and sends magnetic field detection flag "0" as magnetic field detection data to the radio wave transmitting section 240, together with the tag ID, and the setup magnetic field detecting sensitivity information (i.e., the maximum magnetic field detecting sensitivity level). Then, the radio wave transmitting section 240 converts the tag ID, the magnetic field detection flag and the magnetic field detecting sensitivity information into a radio wave signal, and transmits the radio wave signal (512). When the magnetic field has not been detected, the tag enters a standby state for 1 to 10 seconds (514), and then the routine returns to the processing for the determination on magnet field detection (515).

When the magnetic field has been detected under the condition that the setup magnetic field detecting sensitivity=maximum level, the microcomputer 215 secondly sets the magnetic field detecting sensitivity to the medium level and sends a corresponding magnetic field detecting sensitivity setting signal to the magnetic field detecting IC 204 (510). Then, the magnetic field detecting IC 204 sends a signal indicative of whether or not the magnetic field has been detected, to the microcomputer 215. In response to receiving the signal, the microcomputer 215 determines whether or not the magnetic field has been detected (516). When the magnetic field has been detected (517), the microcomputer 215 changes the magnetic field detection flag from "0" to "1", and sends the magnetic field detection flag "1" as magnetic field detection data to the radio wave transmitting section 240, together with the tag ID, and information about the setup magnetic field detecting sensitivity (i.e., the medium magnetic field detecting sensitivity level). Then, the radio wave transmitting section 240 converts the tag ID, the magnetic field detection flag and the magnetic field detecting sensitivity information into a radio wave signal, and transmits the radio wave signal (519).

On the other hand, when the magnetic field has not been detected (518), the microcomputer 215 keeps the current magnetic field detection flag "0", and sends magnetic field detection flag "0" as magnetic field detection data to the radio wave transmitting section 240, together with the tag ID, and the setup magnetic field detecting sensitivity information (i.e., the medium magnetic field detecting sensitivity level). Then, the radio wave transmitting section 240 converts the tag ID, the magnetic field detection flag and the magnetic field detecting sensitivity information into a radio wave signal, and transmits the radio wave signal (523). When the magnetic field has not been detected, the process also returns to the steps for the determination on magnet field detection (515).

When the magnetic field has been detected under the condition that the setup magnetic field detecting sensitivity=medium level, the microcomputer 215 thirdly sets the magnetic field detecting sensitivity to the minimum level and sends a corresponding magnetic field detecting sensitivity setting signal to the magnetic field detecting IC 204 (521). Then, the magnetic field detecting IC 204 sends a signal indicative of whether or not the magnetic field has been detected, to the microcomputer 215. In response to receiving the signal, the microcomputer 215 determines whether or not the magnetic field has been detected (523). When the magnetic field has been detected (524), the microcomputer 215 changes the magnetic field detection flag from "0" to "1", and sends the magnetic field detection flag "1" as magnetic field detection data to the radio wave transmitting section 240, together with the tag ID, and information about the setup magnetic field detecting sensitivity (i.e., the minimum magnetic field detecting sensitivity level). Then, the radio wave transmitting section 240 converts the tag ID, the magnetic field detection flag and the magnetic field detecting sensitivity information into a radio wave signal, and transmits the radio wave signal (526). Subsequently, under the condition that the setup magnetic field detecting sensitivity=minimum level, the routine returns to the processing for the determination on magnetic field detection (523) (527).

On the other hand, when the magnetic field has not been detected (525), the microcomputer 215 keeps the current magnetic field detection flag "0", and sends magnetic field detection flag "0" as magnetic field detection data to the radio wave transmitting section 240, together with the tag ID, and the setup magnetic field detecting sensitivity information (i.e., the minimum magnetic field detecting sensitivity level). Then, the radio wave transmitting section converts the tag ID, the magnetic field detection flag and the magnetic field detecting sensitivity information into a radio wave signal, and transmits the radio wave signal (528). When the magnetic field has not been detected, the process also returns to the steps for the determination on magnet field detection (515).

In the process flow illustrated in FIG. 6, in the case where the magnetic field has been detected when the setup magnetic field detecting sensitivity=maximum level, but the magnetic field has not been detected when the setup magnetic field detecting sensitivity=medium level, it can be determined that the RFID tag is located at a position between the boarder of the setup magnetic field detecting sensitivity=maximum level and the boarder of the setup magnetic field detecting sensitivity=the medium level. Further, in the case where the magnetic field has been detected when the setup magnetic field detecting sensitivity=medium level, but the magnetic field has not been detected when the setup magnetic field detecting sensitivity=minimum level, it can be determined that the RFID tag is located at a position between the boarder of the setup magnetic field detecting sensitivity=medium level and the boarder of the setup magnetic field detecting sensitivity=minimum level.

As mentioned above, the position of the RFID tag can be accurately detected by the process flow in the PFID tag. It is to be understood that the number of magnetic field detecting sensitivity levels is not limited to three, but may be preferably increased, because accuracy of the position detection becomes higher along with an increase in number of the levels. On the other hand, even if the number of the levels is set to two, the above process flow is applicable.

FIG. 7 illustrates one example of a content of data in the radio wave signal 121 to be transmitted from the RFID tag to the distance detection control unit, in the proximity detection system according to the first embodiment. For example, a bit sequence starts with an 8-bit synchronization frame 610 for frame synchronization, followed by a 24-bit tag ID (identification number) 602 unique to the RFDI tag. Then, followed by 1-bit magnetic field detection data (magnetic field detection flag) 603. As for the magnetic field detection flag, for example, "0" indicates the absence of magnetic field detection (that the magnetic field has not been detected), and "1" indicates the presence of magnetic field detection (that the magnetic field has been detected). Then, followed by setup magnetic field detecting sensitivity data 604. As for the setup magnetic field detecting sensitivity data 604, for example, "000", "100" and "111" indicate, respectively, "setup magnetic field detecting sensitivity=maximum level", "setup magnetic field detecting sensitivity=medium level", and "setup magnetic field detecting sensitivity=minimum level".

FIG. 8 is a flow chart illustrating a process to be executed in the distance detection control unit of the proximity detection system according to the first embodiment.

Additionally with reference to FIG. 5, first of all, when the distance detection control unit is powered on (701, 702), the magnetic field emitting section 403 starts to emit an AC inductive magnetic field (703). As for the magnetic field emission, a duration of each emission ON time is, for example, in the range of 1 to 20 msec, and an emission interval is, for example, in the range of 100 msec to 1 sec. Although not illustrated, upon power-on of the unit, the radio wave receiving section 401 and the control section 402 are also powered on.

When the unit is in a communication range (e.g., 10 to 20 m) in which a radio wave signal from an RFID tag is receivable, the radio wave receiving section 401 can receive the radio wave signal. Then, the microcomputer 428 of the control section 402 first determines whether or not a tag ID has been received (705). When the tag ID has been received (706), it is determined whether or not magnetic field detection data (flag) is "1" (708). On the other hand, when no tag ID has been detected (707), after elapse of a standby time, for example, of 100 msec to 1 sec (719), the routine returns to the processing of emitting the magnetic field and waiting for receipt of a tag ID (720).

When the magnetic field detection data (flag) is "1" (709), it is determined whether or not setup magnetic field detecting sensitivity data is the maximum level (714). When the setup magnetic field detecting sensitivity data is the maximum level (715), an alarm level setting processing is performed, and then a first-level alarm signal is output. The term "alarm signal" herein means a control signal for a revolving light, an audio alarming device or the like.

The alarm level setting processing herein includes, for example, a processing of preliminarily determining a level of alarm depending on the level of the setup magnetic field detecting sensitivity data received by the distance detection control unit. For example, the alarm level setting processing includes a processing of outputting no alarm signal when the setup magnetic field detecting sensitivity data is the maximum level, and outputting the alarm signal when the setup magnetic field detecting sensitivity data is the medium level.

When the setup magnetic field detecting sensitivity data is not the maximum level, it is determined whether or not the setup magnetic field detecting sensitivity data is the medium level (721). When the setup magnetic field detecting sensitivity data is the medium level (722), the alarm level setting processing is performed, and then a second-level alarm signal is output. When the setup magnetic field detecting sensitivity data is not the medium level (723), it is determined whether or not the setup magnetic field detecting sensitivity data is the minimum level (724). When the setup magnetic field detecting sensitivity data is the minimum level (725), the alarm level setting processing is performed, and then a third-level alarm signal is output. When the setup magnetic field detecting sensitivity data is not the minimum level (726), an error processing is performed (732), and the routine returns to the flow position just after the power-on.

When the magnetic field detection data is not "1" (710), it is determined whether or not the setup magnetic field detecting sensitivity data is the maximum level (711). When the setup magnetic field detecting sensitivity data is the maximum level, this situation means that the tag is at a position from which the tag ID is receivable and where the magnetic field cannot be detected, so that only an ID detection processing is performed (717), and the routine returns to a flow position just after the power-on (720). When the magnetic field detection data is not "1", and the setup magnetic field detecting sensitivity data is not the maximum level (713), the routine advances to the determination on whether or not the setup magnetic field detecting sensitivity data is the medium level (721).

As above, according to the process flow in FIG. 8 to be executed in the distance detection control unit 100, an alarm signal can be output at a desired detection distance, based on the magnetic field detection data and the setup magnetic field detecting sensitivity data transmitted from the RFID tag, and further the alarm signal can be varied depending on the detection distance.

Next, FIGS. 9A and 9B are a flow chart illustrating a process to be executed in a distance detection control unit of a proximity detection system according to a second embodiment of the present invention. This flow shows one example of a process in a situation where two different RFID tags are located within a magnetic field-detectable range.

Additionally with reference to FIG. 5, first of all, when the distance detection control unit is powered on (801, 802), the magnetic field emitting section 403 starts to emit an AC inductive magnetic field (803). As for the magnetic field emission, a duration of each emission ON time is, for example, in the range of 1 to 20 msec, and an emission interval is, for example, in the range of 100 msec to 1 sec. Although not illustrated, upon power-on of the unit, the radio wave receiving section 401 and the control section 402 are also powered on.

When the unit is in a communication range (e.g., 10 to 20 m) in which a radio wave signal from an RFID tag is receivable, the radio wave receiving section 401 can receive the radio wave signal. Then, the microcomputer 428 of the control section 402 first determines whether or not a tag ID has been received (805). When the tag ID has been received (807), it is determined whether or not two different tags IDs have been received. For example, this is determined based on how many different tag IDs the microcomputer 428 can recognize within a time period of 1 to 10 sec. When only one tags ID has been received, the same process flow as that illustrated in FIG. 8 to be executed in the distance detection control unit of the proximity detection system according to the first embodiment is performed (821).

When two different tag IDs have been received (809), it is determined whether or not magnetic field detection data of a first tag identified by one of the tag IDs is "1" (811). When the magnetic field detection data of the first tag is "1" (813), it is determined whether or not setup magnetic field detecting sensitivity data of the first tag is the maximum level (814). When the setup magnetic field detecting sensitivity data of the first tag is the maximum level, the alarm level setting processing is performed, and then the routine moves to processing for a second tag identified by the other tag ID (843).

When the magnetic field detection data of the first tag is not "1" (812), it is determined whether or not the setup magnetic field detecting sensitivity data of the first tag is the maximum level (817). When the setup magnetic field detecting sensitivity data of the first tag is the maximum level, this situation means that the first tag is at a position from which the tag ID thereof is receivable and where the magnetic field cannot be detected, so that only the ID detection processing is performed (820), and the routine returns to a flow position just after the power-on (823).

When the magnetic field detection data of the first tag is not "1", and the setup magnetic field detecting sensitivity data of the first tag is not the maximum level (818), the routine advances to a determination on whether or not the setup magnetic field detecting sensitivity data of the first tag is the medium level (824). Similarly, when the magnetic field detection data of the first tag is "1", and the setup magnetic field detecting sensitivity data of the first tag is not the maximum level (816), it is determined whether or not the setup magnetic field detecting sensitivity data of the first tag is the medium level (824). When the setup magnetic field detecting sensitivity data of the first tag is the medium level (833), the alarm level setting processing is performed, and then the routine moves to the processing for the second tag (843).

When the setup magnetic field detecting sensitivity data of the first tag is not the medium level (825), it is determined whether or not the setup magnetic field detecting sensitivity data of the first tag is the minimum level (826). When the setup magnetic field detecting sensitivity data of the first tag is the minimum level (829), the alarm level setting processing is performed, and then the routine moves to the processing for the second tag (843). When the setup magnetic field detecting sensitivity data of the first tag is not the minimum level (828), the error processing is performed (834), and then the routine returns to the flow position just after the power-on (823).

Subsequently, it is determined whether or not magnetic field detection data of the second tag is "1" (844). When the magnetic field detection data of the second tag is "1" (813), it is determined whether or not setup magnetic field detecting sensitivity data of the second tag is the maximum level (857). When the setup magnetic field detecting sensitivity data of the second tag is the maximum level, the alarm level setting processing is performed (862), whereafter a selection processing is performed (867), and an alarm signal is output (869). The selection processing (867) means a processing of selecting one of the first and second tags having a lower one of the levels of magnetic field detecting sensitivity. In other words, one of the first and second tags which is located more proximal to the distance detection control unit is selected.

When the magnetic field detection data of the second tag is not "1" (846), it is determined whether or not the setup magnetic field detecting sensitivity data of the second tag is the maximum level (850). When the setup magnetic field detecting sensitivity data of the second tag is the maximum level, this situation means that the second tag is at a position from which the tag ID thereof is receivable and where the magnetic field cannot be detected, so that only the ID detection processing is performed (853), and the routine returns to the flow position just after the power-on (823).

When the magnetic field detection data of the second tag is not "1", and the setup magnetic field detecting sensitivity data of the second tag is not the maximum level (852), the routine advances to a determination on whether or not the setup magnetic field detecting sensitivity data of the second tag is the medium level (854). Similarly, when the magnetic field detection data of the second tag is "1", and the setup magnetic field detecting sensitivity data of the second tag is not the maximum level (849), it is determined whether or not the setup magnetic field detecting sensitivity data of the second tag is the medium level (854). When the setup magnetic field detecting sensitivity data of the second tag is the medium level (855), the alarm level setting processing is performed (862), whereafter the selection processing is performed (867), and an alarm signal is output (869).

When the setup magnetic field detecting sensitivity data of the second tag is not the medium level (856), it is determined whether or not the setup magnetic field detecting sensitivity data of the second tag is the minimum level (859). When the setup magnetic field detecting sensitivity data of the second tag is the minimum level (860), the alarm level setting processing is performed (862), whereafter the selection processing is performed (867), and an alarm signal is output (869). When the setup magnetic field detecting sensitivity data of the second tag is not the minimum level (861), the error processing is performed (866), and then the routine returns to the flow position just after the power-on (823).

As above, according to the process flow to be executed in the distance detection control unit of the proximity detection system according to the second embodiment, in the situation where the first RFID tag and the second RFID tag are located within a magnetic field-detectable range, it becomes possible to select one of the RFID tags which is located more proximal to the distance detection control unit, and output an alarm for the selected RFID tag. In the second embodiment, the process flow has been described in detail based on an example where there are two RFID tags. However, it is apparent to those skilled in the art that a similar process flow can be used even when the number of the tags is increased to three or more.

In the above embodiments, the proximity detection system is configured to detect a distance between a worker and a self-propelled apparatus. Alternatively, the proximity detection system of the present invention may be configured to detect a distance between a self-propelled apparatus and any other apparatus, or between two self-propelled apparatus.

EXPLANATION OF CODES

1: proximity detection system
10: self-propelled apparatus
100: distance detection control unit
101: magnetic field emitting section
102: first control section
103: radio wave receiving section
104: magnetic field emitting control signal
105: radio wave receiving control signal
106: received data signal
107: alarm signal
108: external input-output signal line
110: magnetic field detecting function-equipped RFID tag
111: magnetic field sensor section
112: second control section
113: radio wave transmitting section
114: power supply section
115: magnetic field detecting sensitivity setting data
116: magnetic field detection signal
120: AC inductive magnetic field
121: radio wave signal
130: alarming device
131: external device

What is claimed is:

1. A proximity detection system configured to detect a distance between a distance detection control unit and each of a plurality of magnetic field detecting function-equipped RFID tags to generate a proximity alarm, wherein:
the distance detection control unit comprises
an inductive magnetic field emitting section,
a radio wave receiving section, and
a first control section operable to control the radio wave receiving section and the magnetic field emitting section; and
each of the plurality of magnetic field detecting function-equipped RFID tags comprises
a magnetic field sensor section operable to detect an inductive magnetic field emitted from the inductive magnetic field emitting section,
a second control section operable to set a magnetic field detecting sensitivity of the magnetic field sensor section based on magnetic field detecting sensitivity setting data, and receive a magnetic field detection signal from the magnetic field sensor section, and
a radio wave transmitting section operable to receive a signal from the second control section, and transmit at least a unique identification number of the magnetic field detecting function-equipped RFID tag, magnetic field detection data, and setup magnetic field detecting sensitivity data,
and wherein:
the magnetic field sensor section comprises a magnetic field detecting IC which is capable of setting a magnetic field amplification gain at a plurality of levels, wherein the magnetic field amplification gains are adjustable according to a gain setting signal from the second control section, wherein the gain setting signal is substantially synonymous with the setup magnetic field detecting sensitivity data;

the setup magnetic field detecting sensitivity data includes at least two levels of magnetic field detecting sensitivity;

the second control section comprises
- means for changing a magnetic field detecting sensitivity level of the magnetic field detecting sensitivity data, and
- means for determining the presence or absence of the magnetic field detection signal while changing the magnetic field detecting sensitivity level of the magnetic field detecting sensitivity data from a maximum level to a minimum level in this order; and the first control section is capable of receiving the magnetic field detection data, the setup magnetic field detecting sensitivity data, and the unique identification numbers from the plurality of the magnetic field detecting function-equipped RFID tags via the radio wave receiving section, and based on the setup received magnetic field detecting sensitivity data and the unique identification numbers, performing an alarm level setting processing of determining a level of alarm depending on the level of the setup magnetic field detecting sensitivity data, so as to output a plurality of levels of proximity alarm.

2. The proximity detection system as defined in claim 1, wherein:

the magnetic field sensor section is capable of varying the magnetic field detecting sensitivity based on the magnetic field detecting sensitivity setting data transmitted from the second control section; and each of the plurality of magnetic field detecting function-equipped RFID tags is capable of intermittently transmitting the magnetic field detection data and the setup magnetic field detecting sensitivity data, based on the at least two levels of magnetic field detecting sensitivity.

3. The proximity detection system as defined in claim 1, wherein the one of the plurality of magnetic field detecting function-equipped RFID tags having a lowest one of the levels of magnetic field detecting sensitivity, based on the plurality of setup magnetic field detecting sensitivity data, is selected to output a proximity alarm for the selected magnetic field detecting function-equipped RFID tag.

4. The proximity detection system as defined in claim 1, wherein the distance detection control unit is installed in an apparatus, and each of the plurality of magnetic field detecting function-equipped RFID tags is attached to a different worker.

5. The proximity detection system as defined in claim 1, wherein the distance detection control unit is installed in a first apparatus, and each of the plurality of magnetic field detecting function-equipped RFID tags is installed in each of a different apparatus, and wherein at least one of the first apparatus and the each of a different apparatus is a self-propelled apparatus.

6. The proximity detection system as defined in claim 2, wherein one of the plurality of magnetic field detecting function-equipped RFID tags having a lowest one of the levels of magnetic field detecting sensitivity, based on the plurality of setup magnetic field detecting sensitivity data, is selected to output a proximity alarm for the selected magnetic field detecting function-equipped RFID tag.

7. The proximity detection system as defined in claim 6, wherein the distance detection control unit is installed in an apparatus, and each of the plurality of magnetic field detecting function-equipped RFID tags is attached to a different worker.

8. The proximity detection system as defined in claim 6, wherein the distance detection control unit is installed in a first apparatus, and each of the plurality of magnetic field detecting function-equipped RFID tags is installed in each of a different apparatus, and wherein at least one of the first apparatus and the each of a different apparatus is a self-propelled apparatus.

9. The proximity detection system as defined in claim 2, wherein the distance detection control unit is installed in an apparatus, and each of the plurality of magnetic field detecting function-equipped RFID tags is attached to a different worker.

10. The proximity detection system as defined in claim 2, wherein the distance detection control unit is installed in a first apparatus, and each of the plurality of magnetic field detecting function-equipped RFID tags is installed in each of a different apparatus, and wherein at least one of the first apparatus and the each of a different apparatus is a self-propelled apparatus.

11. The proximity detection system as defined in claim 3, wherein the distance detection control unit is installed in an apparatus, and each of the plurality of magnetic field detecting function-equipped RFID tags is attached to a different worker.

12. The proximity detection system as defined in claim 3, wherein the distance detection control unit is installed in a first apparatus, and each of the plurality of magnetic field detecting function-equipped RFID tags is installed in each of a different apparatus, and wherein at least one of the first apparatus and the each of a different apparatus is a self-propelled apparatus.

* * * * *